US008789052B2

(12) United States Patent
Small

(10) Patent No.: US 8,789,052 B2
(45) Date of Patent: Jul. 22, 2014

(54) SYSTEM AND METHOD FOR CONTROLLING PROCESSOR USAGE ACCORDING TO USER INPUT

(75) Inventor: Aaron Bradley Small, Richmond Hill (CA)

(73) Assignee: Blackbery Limited, Waterloo (CA)

( * ) Notice: Subject to any disclaimer, the term of this patent is extended or adjusted under 35 U.S.C. 154(b) by 1426 days.

(21) Appl. No.: 11/692,235

(22) Filed: Mar. 28, 2007

(65) Prior Publication Data

US 2008/0243276 A1     Oct. 2, 2008

(51) Int. Cl.
*G06F 9/46* (2006.01)

(52) U.S. Cl.
USPC ............. 718/100; 718/103; 718/104; 700/94; 700/99; 700/100; 700/90

(58) Field of Classification Search
USPC ................ 700/90, 94, 99; 718/106, 102, 100, 718/103–104; 711/100; 706/106; 715/716, 715/719, 738; 707/999, 102; 709/226, 219; 701/90; 235/375–386, 4; 708/1
See application file for complete search history.

(56) References Cited

U.S. PATENT DOCUMENTS

| | | | |
|---|---|---|---|
| 5,794,036 A * | 8/1998 | Gomi et al. ................... | 718/105 |
| 6,108,683 A * | 8/2000 | Kamada et al. ............... | 718/103 |
| 6,189,022 B1 * | 2/2001 | Binns ............................ | 718/100 |
| 6,272,517 B1 * | 8/2001 | Yue et al. ...................... | 718/102 |
| 6,438,573 B1 * | 8/2002 | Nilsen .......................... | 718/100 |
| 6,694,419 B1 * | 2/2004 | Schnee et al. ................. | 711/173 |
| 6,738,886 B1 * | 5/2004 | Mendoza et al. ............. | 711/173 |
| 6,742,099 B1 * | 5/2004 | Mendoza et al. ............. | 711/173 |
| 6,742,100 B1 * | 5/2004 | Schnee et al. ................. | 711/173 |
| 6,745,312 B1 * | 6/2004 | Schnee et al. ................. | 711/173 |
| 6,964,048 B1 * | 11/2005 | Isham .......................... | 718/104 |
| 6,968,441 B1 * | 11/2005 | Schnee ......................... | 711/173 |
| 7,111,177 B1 | 9/2006 | Chauvel et al. | |
| 7,389,195 B2 * | 6/2008 | Capps et al. .................. | 702/118 |
| 7,523,286 B2 * | 4/2009 | Ramany et al. ............... | 711/170 |
| 7,930,681 B2 * | 4/2011 | Kloeffer et al. .............. | 717/120 |
| 8,180,919 B1 * | 5/2012 | Melinn et al. ................. | 709/236 |

(Continued)

FOREIGN PATENT DOCUMENTS

| | | | |
|---|---|---|---|
| CA | 2626940 A1 * | 9/2008 | |
| CN | 101349977 A * | 1/2009 | |
| EP | 1489508 | 12/2004 | |
| EP | 1975794 A1 * | 10/2008 | |

OTHER PUBLICATIONS

Mullender, Sape J., et al., A distributed file service based on optimistic concurrency control, ACM Symposium on Operating System Principles (Orcas Island, Washington). Published as Operating Systems Review, 19(5):51-62, Dec. 1985.*

(Continued)

*Primary Examiner* — Cuong H Nguyen
(74) *Attorney, Agent, or Firm* — Brett J. Slaney; Blake, Cassels & Graydon LLP

(57) ABSTRACT

A system and method for controlling processor usage according to user related tasks is provided. For periodic tasks, by increasing the period at which the task runs, the average processor usage can be reduced to meet a particular target which can ensure that user input is not affected by the periodic task. As such, the periodic task can be intelligently degraded and altered to compensate for such degradation in order to free up enough processor usage space so as to not adversely affect user input.

16 Claims, 11 Drawing Sheets

(56) References Cited

U.S. PATENT DOCUMENTS

| | | | |
|---|---|---|---|
| 2002/0075891 A1* | 6/2002 | Souissi | 370/442 |
| 2002/0102962 A1* | 8/2002 | Grinn et al. | 455/406 |
| 2003/0154284 A1* | 8/2003 | Bernardin et al. | 709/226 |
| 2003/0191795 A1* | 10/2003 | Bernardin et al. | 709/105 |
| 2005/0149927 A1* | 7/2005 | Abe | 718/100 |
| 2006/0010446 A1* | 1/2006 | Desai et al. | 718/100 |
| 2006/0031695 A1* | 2/2006 | Isozaki et al. | 713/375 |
| 2006/0074970 A1* | 4/2006 | Narayanan et al. | 707/102 |
| 2006/0112247 A1* | 5/2006 | Ramany et al. | 711/165 |
| 2007/0016688 A1* | 1/2007 | Hester et al. | 709/238 |
| 2007/0168874 A1* | 7/2007 | Kloeffer et al. | 715/764 |
| 2007/0239386 A1* | 10/2007 | Capps et al. | 702/117 |
| 2008/0062890 A1* | 3/2008 | Temple | 370/254 |
| 2008/0243276 A1* | 10/2008 | Small | 700/90 |

OTHER PUBLICATIONS

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988.*

Dibble, Peter C., et al., Beyond Striping: The Bridge Multiprocessor File System, Computer Science Department, University of Rochester, Aug. 11, 1989.*

Douglis, Fred, et al., A comparison of two distributed systems: Amoeba and Sprite—Computing Systems, 4(4), Fall 1991, pp. 353-385.*

Using Weighted Graphs for Computationally Efficient WLAN Location Determination; Hansen, R.; Thomsen, B.; Mobile and Ubiquitous Systems: Networking & Services, 2007. MobiQuitous 2007. Fourth Annual International Conference on Digital Object Identifier: 10.1109/MOBIQ.2007.4451008; Publication Year: 2007, pp. 1-5.*

Enable++: a second generation FPGA processor; Hogl, H.; Kugel, A.; Ludvig, J.; Manner, R.; Noffz, K.H.; Zoz, R.; FPGAs for Custom Computing Machines, 1995. Proceedings. IEEE Symposium on; Digital Object Identifier: 10.1109/FPGA.1995.477408; Publication Year: 1995, pp. 45-53.*

Evaluation of embedded processor based BDD implementation; Ivosevic, Danko; Sruk, Vlado; MIPRO, 2010 Proceedings of the 33rd International Convention; Publication Year: 2010, pp. 619-623.*

Balanced Cache: Reducing Conflict Misses of Direct-Mapped Caches; Chuanjun Zhang; Computer Architecture, 2006. ISCA '06. 33rd International Symposium on; Digital Object Identifier: 10.1109/ISCA.2006.12; Publication Year: 2006, pp. 155-166.*

Resource management scheme by Petri nets for multiprocessors; Takeda, Y.; Dohi, Y.; Murakoshi, H.; Adachi, T.; Funakubo, N.; Industrial Electronics Society, 1999. IECON '99 Proceedings. The 25th Annual Conference of the IEEE; vol. 2 Digital Object Identifier: 10.1109/IECON.1999.816485; Publication Year: 1999, pp. 692-697 vol. 2.*

Cooperative software multithreading to enhance utilization of embedded processors for network applications; Albrecht, C.; Hagenau, R.; Doring, A.; Parallel, Distributed and Network-Based Processing, 2004. Proceedings. 12th Euromicro Conference on; Digital Object Identifier: 10.1109/EMPDP.2004.1271459; Publication Year: 2004, pp. 300-307.*

A high-efficiency reconfigurable digital signal processor for multimedia computing; Li-Hsun Chen; Chen, O.T.-C.; Ruey-Ling Ma; Circuits and Systems, 2003. ISCAS '03. Proceedings of the 2003 International Symposium on; vol. 2; Digital Object Identifier: 10.1109/ISCAS.2003.1206087; Publication Year: 2003, pp. II-768-II-771 vol. 2.*

Versatile processor design for efficiency and high performance; Ziavras, S.G.; Parallel Architectures, Algorithms and Networks, 2000. I-SPAN 2000. Proceedings. International Symposium on; Digital Object Identifier: 10.1109/ISPAN.2000.900295 Publication Year: 2000, pp. 266-271.*

Threshold-based power allocation algorithms for down-link switched-based parallel scheduling; Sung Sik Nam; Hong-Chuan Yang; Alouini, M.-S.; Qaraqe, K.A; Information, Communications & Signal Processing, 2007 6th International Conference on; Digital Object Identifier: 10.1109/ICICS.2007.4449746; Publication Year: 2007, pp. 1-5.*

Temperature Control of High-Performance Multi-core Platforms Using Convex Optimization; Murali, S.; Mutapcic, A.; Atienza, D.; Gupta, R.; Boyd, S.; Benini, L.; De Micheli, G;.Design, Automation and Test in Europe, 2008. Date '08 Digital Object Identifier: 10.1109/DATE.2008.4484671; Publication Year: 2008, pp. 110-115.*

The future evolution of high-performance microprocessors; Jouppi, N.; icroarchitecture, 2005. MICRO-38. Proceedings. 38th Annual IEEE/ACM International Symposium on; Digital Object Identifier: 10.1109/MICRO.2005.34 Publication Year: 2005.*

Real-Time Dynamic Power Management through Device Forbidden Regions; Devadas, V. ; Aydin, H.; Real-Time and Embedded Technology and Applications Symposium, 2008. RTAS '08. IEEE; Digital Object Identifier: 10.1109/RTAS.2008.21 Publication Year: 2008, pp. 34-44.*

GPU Acceleration of Real-time Feature Based Algorithms ; Ready, J.M.; Taylor, C.N.; Motion and Video Computing, 2007. WMVC '07. IEEE Workshop on; Digital Object Identifier: 10.1109/WMVC.2007.17; Publication Year: 2007, p. 8.*

Buttazzo G C et al: "Minimizing Aperiodic Response Times in a Firm Real-Time Environment" IEEE Transactions on Software Engineering, IEEE Service Center, Jan. 1999, pp. 22-32, vol. 25, No. 1, Los Alamitos, CA, US.

The European Search Report for application No. EP 07 10 5129.

* cited by examiner

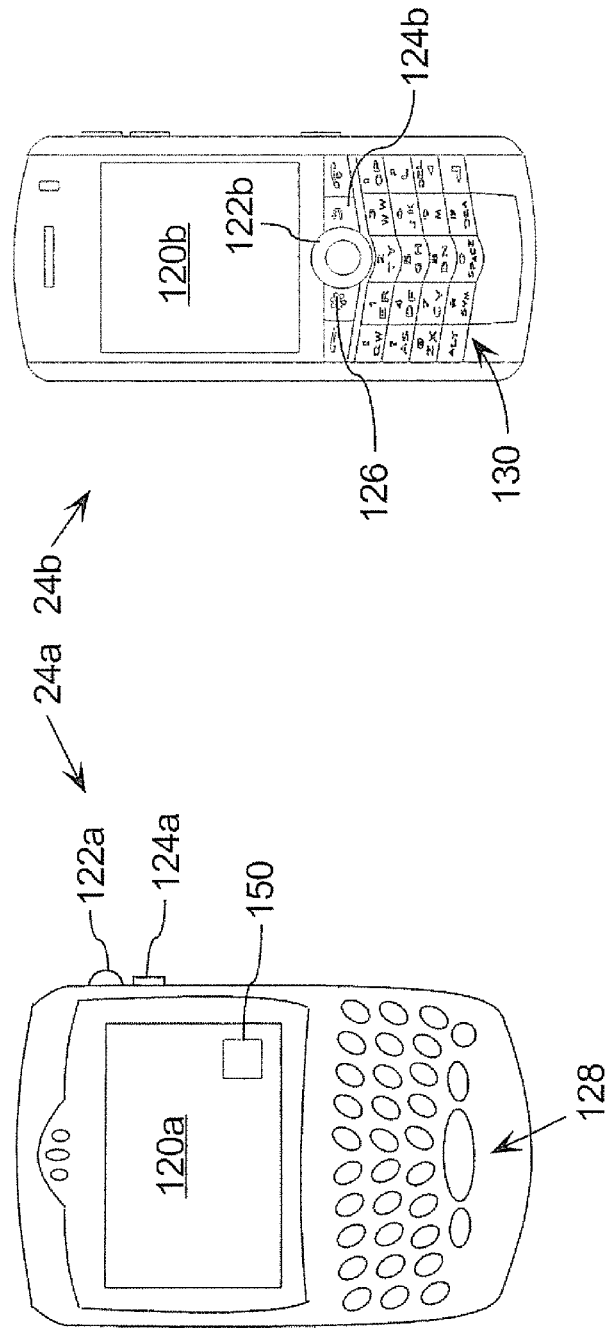

SYSTEM AND METHOD FOR CONTROLLING PROCESSOR USAGE ACCORDING TO USER INPUT

TECHNICAL FIELD

The following relates to systems and methods for controlling processor usage according to user related tasks.

DESCRIPTION OF THE PRIOR ART

A computing device, such as a mobile device, uses a processor to perform tasks. Each task inherently consumes a certain percentage of the processor's overall capability. Many tasks, often referred to as non-interactive tasks, are fixed tasks that are scheduled by a scheduling algorithm. Other tasks, often referred to as interactive tasks, in some way relate to recent input/output (I/O) traffic or user related tasks, such as user input or user directed output. The scheduling algorithm typically aims to schedule interactive tasks for optimal low latency and non-interactive tasks for optimal throughput. An example of a non-interactive task is video decoding, which is done in the background (i.e. the user will not notice as it occurs), and an example of an interactive task is a keystroke or status bar update that the user can readily see on the display of the mobile device.

In a mobile device, when a task saturates the central processor, it may prevent the mobile device from responding to user related tasks such as user input (e.g. keystroke) or user directed output (e.g. status bar update) in a timely manner. For example, a mobile device that is decoding a video may be sluggish when responding to a user moving a positioning device (e.g. to move a cursor on their screen). It is generally desirable to have user input be processed in a timely manner since the user is directly and immediately affected by the delay, which can leave them unsatisfied with the performance of their mobile device.

It is therefore an object of the following to obviate or mitigate at least one of the above disadvantages.

BRIEF DESCRIPTION OF THE DRAWINGS

Embodiments will now be described by way of example only with reference to the appended drawings wherein:

FIG. 6 is a schematic diagram of a mobile device and a display screen therefor.

FIG. 7 is a schematic diagram of another mobile device and a display screen therefor.

DETAILED DESCRIPTION OF THE DRAWINGS

Figure 1:
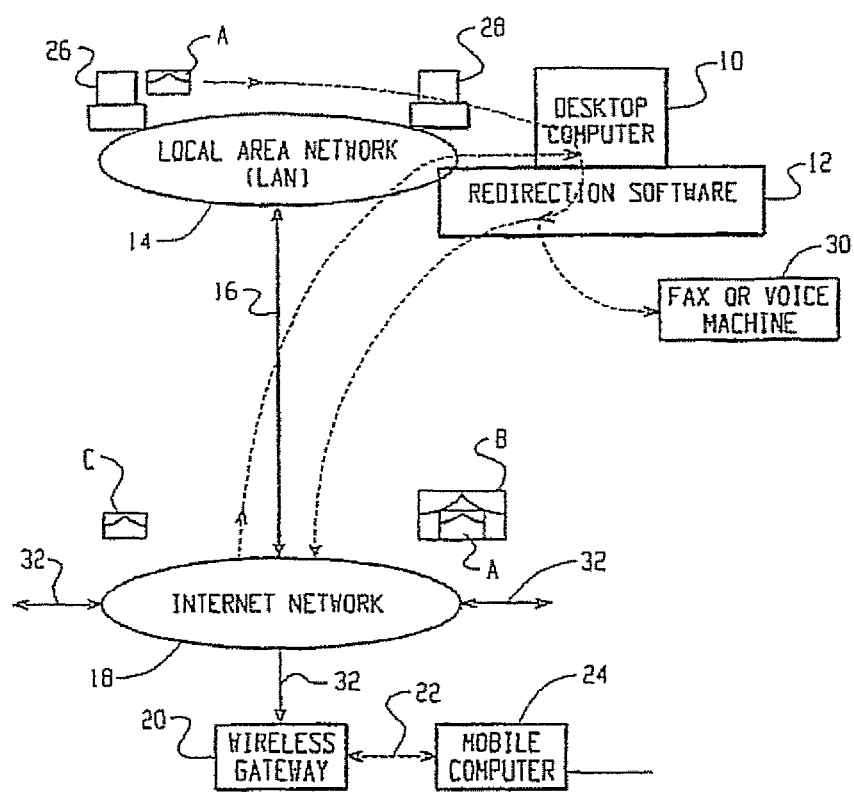
FIG. 1 is a system diagram showing the redirection of user data items from a user's desktop PC (host system) to the user's mobile device, where the redirector software is operating at the user's desktop PC.

Referring now to the drawings, FIG. 1 is an exemplary system diagram showing the redirection of user data items (such as message A or C) from a user's office PC (host system) 10 to the user's mobile device 24, where the redirector software 12 is operating at the user's PC. Message A in FIG. 1 represents an internal message sent from desktop 26 to the user's host system 10 via LAN 14. Message C in FIG. 1 represents an external message from a sender that is not directly connected to LAN 14, such as the user's mobile device 24, some other user's mobile device (not shown), or any user connected to the Internet 18. Message C also represents a command message from the user's mobile device 24 to the host system 10. As described in more detail in FIG. 3, the host system 10 preferably includes, along with the typical hardware and software associated with a workstation or desktop computer, the redirector program 12, a TCP/IP subsystem 42, a primary message store 40, an E-mail subsystem 44, a screen saver subsystem 48, and a keyboard subsystem 46.

In FIG. 1, the host system 10 is the user's desktop system, typically located in the user's office. The host system 10 is connected to a LAN 14, which also connects to other computers 26, 28 that may be in the user's office or elsewhere. The LAN 14, in turn, is connected to a wide area network ("WAN") 18, preferably the Internet, which is defined by the use of the Transmission Control Protocol/Internet Protocol ("TCP/IP") to exchange information, but which, alternatively could be any other type of WAN. The connection of the LAN 14 to the WAN 18 is via high bandwidth link 16, typically a T1 or T3 connection. The WAN 18 in turn is connected to a variety of gateways 20, via connections 32. A gateway forms a connection or bridge between the WAN 18 and some other type of network, such as an RF wireless network, cellular network, satellite network, or other synchronous or asynchronous land-line connection.

In one embodiment, mobile device 24 is a hand-held two-way wireless paging computer, a wirelessly enabled palm-top computer, a mobile telephone with data messaging capabilities, or a wirelessly enabled laptop computer, but could, alternatively be other types of mobile devices capable of sending and receiving messages via a network connection 22. Mobile devices 24 could alternatively not be capable of sending and receiving message via network connection 22. In another embodiment, mobile device 24 is a digital entertainment device, such as an MP3 player or video game device. In yet another embodiment, mobile device 24 is any electronic device which can be used by a user to provide an alarm.

Figure 4:
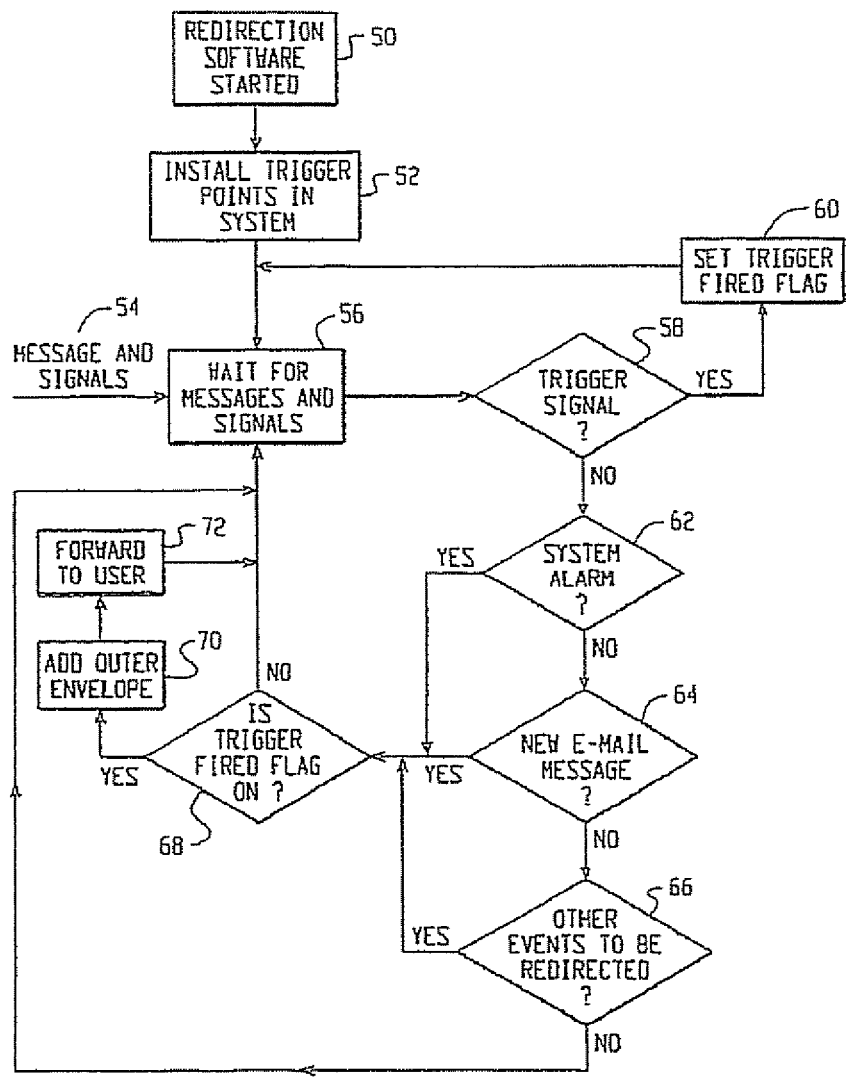
FIG. 4 is a flow chart showing the steps carried out by the redirector software operating at the host system.

In some embodiments, the mobile device 24 includes software program instructions that work in conjunction with the redirector program 12 to enable the seamless, transparent redirection of user-selected data items. FIG. 4 describes the basic method steps of the redirector pro gram 12, and FIG. 5 describes the steps of the corresponding program operating at the mobile device 24.

In an alternative embodiment, not explicitly shown in the drawings, the mobile device 24 also includes a redirector program. In this embodiment, user selected data items can be replicated from the host to the mobile device and vice versa. The configuration and operation of the mobile device 24 having a redirector program is similar to that described herein with respect to FIGS. 1-4.

A user can configure the redirector program 12 to push certain user-selected data items to the user's mobile device 24 when the redirector 12 detects that a particular user-defined event trigger (or trigger point) has taken place. User-selected data items preferably include E-mail messages, calendar events, meeting notifications, address entries, journal entries, personal alerts, alarms, warnings, stock quotes, news bulletins, etc., but could, alternatively, include any other type of message that is transmitted to the host system 10, or that the host system 10 acquires through the use of intelligent agents, such as data that is received after the host system 10 initiates a search of a database or a website or a bulletin board. In some instances, only a portion of the data item is transmitted to the mobile device 24 in order to minimize the amount of data transmitted via the wireless network 22. In these instances, the mobile device 24 can optionally send a command message to the host system to receive more or all of the data item if the user desires to receive it.

Among the user-defined event tuggers that can be detected by the redirector program 12 are, in the preferred embodiment, external events, internal events and networked events. External events preferably include: (1) receiving a command message (such as message C) from the user's mobile device to begin redirection, or to execute some other command at the host, such as a command to enable the preferred list mode, or to add or subtract a particular sender from the preferred list; (2) receiving a similar message from some external computer, and (3) sensing that the user is no longer in the vicinity of the host system; although, alternatively, an external event can be any other detectable occurrence that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the events that could be used to initiate replication of the user-selected data items from the host system 10 to the mobile device 24.

FIG. 1 shows an E-mail message A being communicated over LAN 14 from computer 26 to the user's desktop system 10 (also shown in FIG. 1 is an external message C, which could be an E-mail message from an Internet user, or could be a command message from 22 the user's mobile device 24). Once the message A (or C) reaches the primary message store of the host system 10, it can be detected and acted upon by the redirection software 12. The redirection software 12 can use many methods of detecting new messages. The preferred method of detecting new messages is using Microsoft's® Messaging API (MAPI), in which programs, such as the redirector program 12, register for notifications or 'advise syncs' when chances to a mailbox take place. Other methods of detecting new messages could also be used.

Assuming that the redirector program 12 is activated, and has been configured by the 2 user (either through the sensing of an internal, network or external event) to replicate certain user data items (including messages of type A or C) to the mobile device 24, when the message A is received at the host system 10, the redirector program 12 detects its presence and prepares the message for redirection to the mobile device 24.

In preparing the message for redirection, the redirector program 12 could compress the original message A, could compress the message header, or could encrypt the entire message A to create a secure link to the mobile device 24.

Also programmed into the redirector 12 is the address of the user's mobile device 24, the type of device, and whether the device 24 can accept certain types of attachments, such as word processing or voice attachments. If the user's type of mobile device cannot accept these types of attachments, then the redirector 12 can be programmed to route the attachments to a fax or voice number where the user is located using an attached fax or voice machine 30.

The redirector may also be programmed with a preferred list mode that is configured by the user either at the host system 10, or remotely from the user's mobile device by transmitting a command message C. The preferred list contains a list of senders (other users) whose messages are to be redirected or a list of message characteristics that determine whether a message is to be redirected. If activated, the preferred list mode causes the redirector program 12 to operate like a filter, only redirecting certain user data items based on whether the data item was sent from a sender on the preferred list or has certain message characteristics that if present will trigger or suppress redirection of the message. In the example of FIG. 1, if desktop system 26 was operated by a user on the preferred list of host system 10, and the preferred list option was activated, then message A would be redirected. If, however, desktop 26 was operated by a user not on the host system's preferred list, then message A would not be redirected, even if the user of the host system had configured the redirector to push messages of type A. The user of the host system 10 can configure the preferred list directly from the desktop system, or, alternatively, the user can then send a command message (such as C) from the mobile device 24 to the desktop system 10 to activate the preferred list mode, or to add or delete certain senders or message characteristics from the preferred list that was previously configured. It should be appreciated that a redirection program could combine message characteristics and preferred sender lists to result in a more finely-tuned filter. Messages marked as low priority or that are simple return receipts or message read receipts, for example, could always be suppressed from redirection while messages from a particular sender would always be redirected.

After the redirector has determined that a particular message should be redirected, and it has prepared the message for redirection, the software 12 then sends the message A to a secondary memory store located in the mobile device 24, using whatever means are necessary. In the preferred embodiment this method is to send the message A back over the LAN 14, WAN 18, and through the wireless gateway 20 to the mobile device 24. In doing so, the redirector preferably repackages message A as an E-mail with an outer envelope B that contains the addressing information of the mobile device 24, although alternative repackaging techniques and protocols could be used, such as a TCP/IP repackaging and delivery method (most commonly used in the alternative server configuration shown in FIG. 2). The wireless gateway 20 requires this outer envelope information B in order to know where to send the redirected message A. Once the message (A in B) is received by the mobile device 24, the outer envelope B is removed and the original message A is placed in the secondary memory store within the mobile device 24. By repackaging and removing the outer envelope in this manner, the mobile computer 24 appears to be at the same physical location as the host system 10, thus creating a transparent system.

In the case where message C is representative of an external message from a computer on the Internet 18 to the host system 10, and the host 10 has been configured to redirect messages of type C, then in a similar manner to message A, message C would be repackaged with an outer envelope B and transmitted to the user's mobile device 24. In the case where message C is representative of a command message from the user's mobile device 24 to the host system 10, the command message C is not redirected, but is acted upon by the host system 10.

If the redirected user data item is an E-mail message, as described above, the user at the mobile device 24 sees the original subject, sender's address, destination address, carbon copy and blind carbon copy. When the user replies to this message, or when the user authors a new message, the software operating at the mobile device 24 adds a similar outer envelope to the reply message (or the new message) to cause the message to be routed first to the user's host system 10, which then removes the outer envelope and redirects the message to the final destination, such as back to computer 26. In the preferred embodiment this results in the outgoing redirected message from the user's host system 10 being sent using the E-mail address of the host mailbox, rather than the address of the mobile device, so that it appears to the recipient of the message that the message originated from the user's desktop system 10 rather than the mobile device. Any replies to the redirected message will then be sent to the desktop system 10, which if it is still in redirector mode, will repackage the reply and resend it to the user's mobile data device, as described above.

Figure 2:
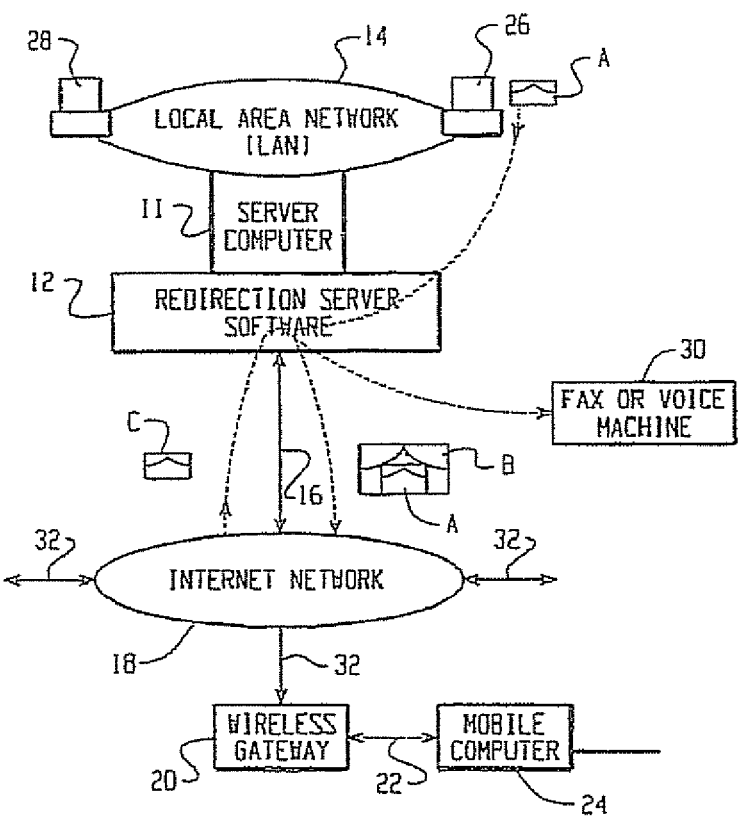
FIG. 2 is a system diagram showing the redirection of user data items from a network server (host system) to the user's mobile device, where the redirector software is operating at the server.

FIG. 2 is an alternative system diagram showing the redirection of user data items from a network server 11 to the user's mobile device 24, where the redirector software 12 is operating at the server 11. This configuration is particularly advantageous for use with message servers such as Microsoft's® Exchange Server, which is normally operated so that all user messages are kept in one central location or mailbox store on the server instead of in a store within each user's desktop PC. This configuration has the additional advantage of allowing a single system administrator to configure and keep track of all users having messages redirected. If the system includes encryption keys, these too can be kept at one place for management and update purposes.

In this alternative configurations, server 11 preferably maintains a user profile for each user's desktop system 10, 26, 28, including information such as whether a particular user can have data items redirected, which types of message and information to redirect, what events will trigger redirection, the address of the users' mobile device 24, the type of mobile device, and the user's preferred list, if any. The event triggers are preferably detected at the user's desktop system 10, 26, 28 and can be any of the external, internal or network events listed above. The desktop systems 10, 26, 28 preferably detect these events and then transmit a message to the server computer 11 via LAN 14 to initiate redirection. Although the user data items are preferably stored at the server computer 11 in this embodiment, they could, alternatively, be stored at each user's desktop system 10, 26, 28, which would then transmit them to the server computer 11 after an event has triggered redirection.

As shown in FIG. 2, desktop system 26 generates a message A that is transmitted to and stored at the host system 11, which is the network server operating the redirector program 12. The message A is for desktop system 10, but in this embodiment, user messages are stored at the network server 11. When an event occurs at desktop system 10, an event trigger is generated and transmitted to the network server 11, which then determines who the trigger is from, whether that desktop has redirection capabilities, and if so, the server (operating the redirector program) uses the stored configuration information to redirect message A to the mobile computer 24 associated with the user of desktop system 10.

As described above with reference to FIG. 1, message C could be either a command message from a user's mobile device 24, or it could be a message from an external computer; such as a computer connected to the Internet 18. If the message C is from an Internet computer to the user's desktop system 10, and the user has redirection capabilities, then the server 11 detects the message C, repackages it using electronic envelope B, and redirects the repackaged message (C in B) to the user's mobile device 24. If the message C is a command message from the user's mobile device 24, then the server 11 simply acts upon the command message.

Figure 3:
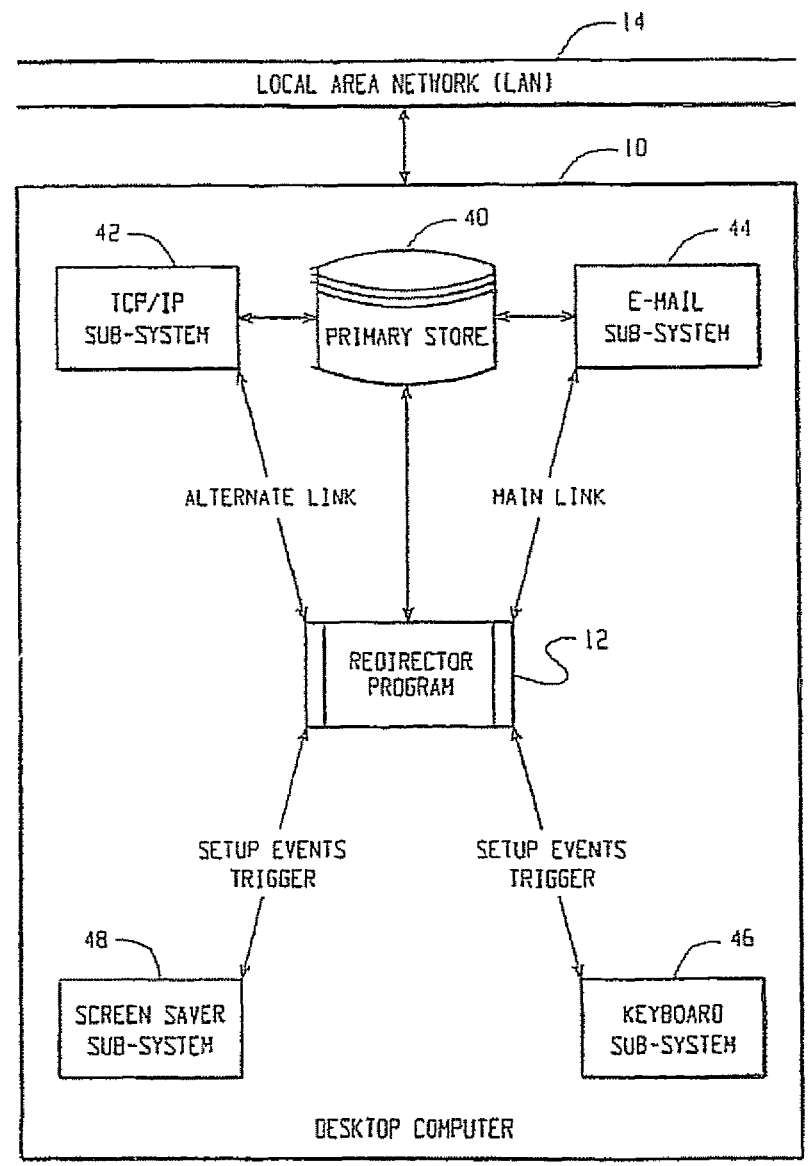
FIG. 3 is a block diagram showing the interaction of the redirector software with other components of the host system in FIG. 1 (the user's desktop PC) to enable the pushing of information from the host system to the user's mobile device.

Turning now to FIG. 3, a block diagram showing the interaction of the redirector software 12 with additional components of the host system 10 of FIG. 1 (the desktop PC) to enable more fully the pushing of information from the host system 10 to the user's mobile device 24 is set forth. These additional components are illustrative of the type of event-generating systems that can be configured and used with the redirector software 12, and of the type of repackaging systems that can be used to interface with the mobile communication device 24 to make it appear transparent to the user.

The desktop system 10 is connected to LAN 14, and can send and receive data, messages, signals, event triggers, etc., to and from other systems connected to the LAN 14 and to external networks 18, 22, such as the Internet or a wireless data network, which are also coupled to the LAN 14. In addition to the standard hardware, operating system, and application programs associated with a typical microcomputer or workstation, the desktop system 10 includes the redirector program 12, a TCP/IP sub-system 42, an E-mail sub-system 44, a primary data storage device 40, a screen saver sub-system 48, and a keyboard sub-system 46. The TCP/IP and E-mail subsystems 42, 44 are examples of repackaging systems that can be used to achieve transparency, and the screen saver and keyboard sub-systems 46, 48 are examples of event generating systems that can be configured to generate event messages or signals that trigger redirection of the user selected data items.

The method steps carried out by the redirector program 12 are described in more detail in FIG. 4. The basic functions of this program are: (1) configure and setup the user-defined event trigger points that will start redirection; (2) configure the types of user data items for redirection and optionally configure a preferred list of senders whose messages are to be redirected; (3) configure the type and capabilities of the user's mobile device; (4) receive messages and signals from the repackaging systems and the event generating systems; and (5) command and control the redirection of the user-selected data items to the mobile device via the repackaging systems. Other functions not specifically enumerated could also be integrated into this program.

The E-Mail sub-system 44 is the preferred link to repackaging the user-selected data items for transmission to the mobile device 24, and preferably uses industry standard mail protocols, such as SMTP, POP, IMAP, MIME and RFC-822, to name but a few. The E-Mail sub-system 44 can receive messages A from external computers on the LAN 14, or can receive messages C from some external network such as the Internet 18 or a wireless data communication network 22, and stores these messages in the primary data store 40. Assuming that the redirector 12 has been triggered to redirect messages of this type, the redirector detects the presence of any new messages and instructs the E-Mail system 44 to repackage the message by placing an outer wrapper B about the original message A (or C), and by providing the addressing information of the mobile device 24 on the outer wrapper B. As noted above, this outer wrapper B is removed by the mobile device 24, and the original message A (or C) is then recovered, thus making the mobile device 24 appear to be the desktop system 10.

In addition, the E-Mail sub-system 44 receives messages back from the mobile device 24 having an outer wrapper with the addressing information of the desktop system 10, and strips this information away so that the message can be routed to the proper sender of the original message A (or C). The E-Mail sub-system also receives command messages C from the mobile device 24 that are directed to the desktop system 10 to trigger redirection or to carry out some other function. The functionality of the E-Mail sub-system 44 is controlled by the redirector program 12.

The TCP/IP sub-system 42 is an alternative repackaging system. It includes all of the functionality of the E-Mail sub-system 44, but instead of repackaging the user-selected data items as standard E-mail messages, this system repackages the data items using special-purpose TCP/IP packaging techniques. This type of special-purpose sub-system is useful in situations where security and improved speed are important to the user. The provision of a special-purpose wrapper that can only be removed by special software on the mobile device 24 provides the added security, and the bypassing of E-mail store and forward systems can improve speed and real-time delivery.

As described previously, the system can be triggered to begin redirection upon detecting numerous external, internal and networked events, or trigger points. Examples of external events include: receiving a command message from the user's mobile device 24 to begin redirection; receiving a similar message from some external computer, sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer that is connected to the host system via a network to initiate redirection.

The screen saver and keyboard sub-systems 46, 48 are examples of systems that are capable of generating internal events. Functionally, the redirector program 12 provides the user with the ability to configure the screen saver and keyboard systems so that under certain conditions an event trigger will be generated that can be detected by the redirector 12 to start the redirection process. For example, the screen saver system can be configured so that when the screen saver is activated, after, for example, ten (10) minutes of inactivity on the desktop system, an event trigger is transmitted to the redirector 12, which starts redirecting the previously selected user data items. In a similar manner the keyboard sub-system can be configured to generate event triggers when no key has been depressed for a particular period of time, thus indicating that redirection should commence. These are just two examples of the numerous application programs and hardware systems internal to the host system 10 that can be used to generate internal event triggers.

Figure 5:
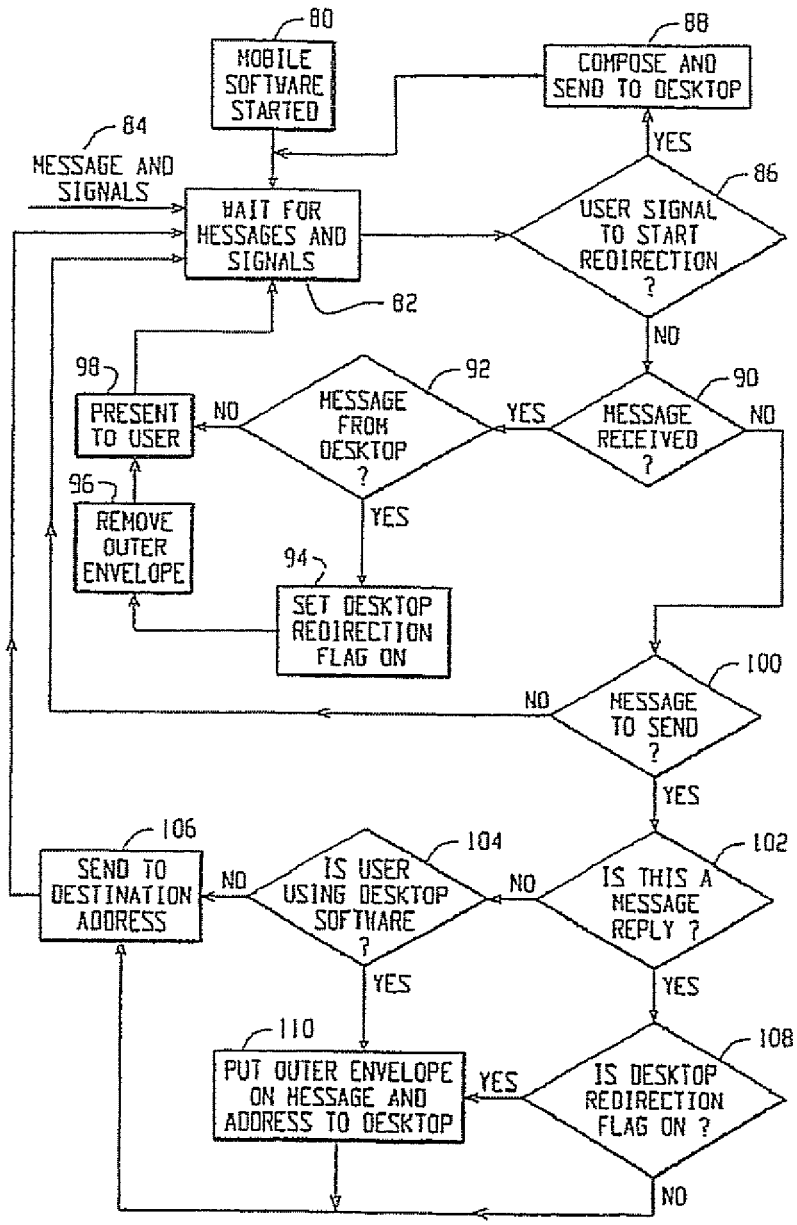
FIG. 5 is a flow chart showing the steps carried out by the mobile device to interface with the redirector software operating at the host system.

FIGS. 4 and 5, set forth, respectively, flow charts showing the steps carried out by the redirector software 12 operating at the host system 10, and the steps carried out by the mobile device 24 in order to interface with the host system. Turning first to FIG. 4, at step 50, the redirector program 12 is started and initially configured The initial configuration of the redirector 12 includes: (1) defining the event triggers that the user has determined will trigger redirection; (2) selecting the user data items for redirection; (3) selecting the repackaging sub-system, either standard E-Mail, or special-purpose technique; (4) selecting the type of data communication device, indicating whether and what type of attachments the device is capable of receiving and processing and inputting the address of the mobile device; and (5) configuring the preferred list of user selected senders whose messages are to be redirected.

FIG. 4 sets forth the basic steps of the redirector program 12 assuming it is operating at a desktop system 10, such as shown in FIG. 1. If the redirector 12 is operating at a network server 11, as shown in FIG. 2, then additional configuration steps may be necessary to enable redirection for a particular desktop system 10, 26, 28 connected to the server, including: (1) setting up a profile for the desktop system indicating its address, events that will trigger redirection, and the data items that are to be redirected upon detecting an event; (2) maintaining a storage area at the server for the data items; and (3) storing the type of data communication device to which the desktop system's data items are to be redirected, whether and what type of attachments the device is capable of receiving and processing, and the address of the mobile device.

Once the redirector program is configured 50, the trigger points (or event triggers) are enabled at step 52. The program 12 then waits 56 for messages and signals 54 to begin the redirection process. A message could be an E-Mail message or some other user data item that may have been selected for redirection, and a signal could be a trigger signal, or could be some other type of signal that has not been configured as an event trigger. When a message or signal is detected, the program determines 58 whether it is one of the trigger events that has been configured by the user to signal redirection. If so, then at step 60 a trigger flag is set, indicating that subsequently received user data items (in the form of messages) that have been selected for redirection should be pushed to the user's mobile device 24.

If the message or signal 54 is not a trigger event, the program then determines at steps 62, 68 and 66 whether the message is, respectively, a system alarm 62, an E-Mail message 64, or some other type of information that has been selected for redirection. If the message or signal is none of these three items, then control returns to step 56, where the redirector waits for additional messages 54 to act upon. If, however the message is one of these three types of information, then the program 12 determines, at step 68, whether the trigger flag has been set, indicating that the user wants these items redirected to the mobile device. If the trigger flag is set, then at step 70, the redirector 12 causes the repackaging system (E-Mail or TCP/IP) to add the outer envelope to the user data item, and at step 72 the repackaged data item is then redirected to the user's mobile device 24 via LAN 14, WAN 18, wireless gateway 20 and wireless network 22. Control then returns to step 56 where the program waits for additional messages and signals to act upon. Although not shown explicitly in FIG. 4, after step 68, the program could, if operating in the preferred list mode, determine whether the sender of a particular data item is on the preferred list, and if not, then the program would skip over steps 70 and 72 and proceed directly back to step 56. If the sender is on the preferred list, then control would similarly pass to steps 70 and 72 for repackaging and transmission of the message from the preferred list sender.

FIG. 5 sets forth the method steps carried out by the user's mobile device 24 in order to interface to the redirector program 12. At step 80 the mobile software is started and the mobile device 24 is configured to operate with the system, including, for example, storing the address of the user's desktop system 10.

At step 82, the mobile device waits for messages and signals 84 to be generated or received. Assuming that the redirector software 12 operating at the user's desktop system 10 is configured to redirect upon receiving a message from the user's mobile device 24, at step 86, the user can decide to generate a command message that will start redirection. If the user does so, then at step 88 the redirection message is composed and sent to the desktop system 10 via the wireless network 22, through the wireless gateway 20, via the Internet 18 to the LAN 14, and is finally routed to the desktop machine 10. In this situation where the mobile device 24 is sending a message directly to the desktop system 10, no outer wrapper is added to the message (such as message C in FIGS. 1 and 2). In addition to the redirection signal, the mobile device 24 could transmit any number of other commands to control the operation of the host system, and in particular the redirector program 12. For example, the mobile 24 could transmit a command to put the host system into the preferred list mode, and then could transmit additional commands to add or subtract certain senders from the preferred list. In this manner, the mobile device 24 can dynamically limit the amount of information being redirected to it by minimizing the number of senders on the preferred list. Other example commands include: (1) a message to change the configuration of the host system to enable the mobile device 24 to receive and process certain attachments; and (2) a message to instruct the host system to redirect an entire data item to the mobile device in the situation where only a portion of a particular data item has been redirected.

Turning back to FIG. 5, if the user signal or message is not a direct message to the desktop system 10 to begin redirection (or some other command), then control is passed to step 90, which determines if a message has been received. If a message is received by the mobile, and it is a message from the user's desktop 10, as determined at step 92, then at step 94 a desktop redirection flag is set "on" for this message, and control passes to step 96 where the outer envelope is removed. Following step 96, or in the situation where the message is not from the user's desktop, as determined at step 92, control passes to step 98, which displays the message for the user on the mobile device's display. The mobile unit 24 then returns to step 82 and waits for additional messages or signals.

If the mobile device 24 determines that a message has not been received at step 90, then control passes to step 100, where the mobile determines whether there is a message to send. If not, then the mobile unit returns to step 82 and waits for additional messages or signals. If there is at least one message to send, then at step 102 the mobile determines whether it is a reply message to a message that was received by the mobile unit. If the message to send is a reply message, then at step 108, the mobile determines whether the desktop redirection flag is on for this message. If the redirection flag is not on, then at step 106 the reply message is simply transmitted from the mobile device to the destination address via the wireless network 22. If, however, the redirection flag is on, then at step 110 the reply message is repackaged with the outer envelope having the addressing information of the user's desktop system 10, and the repackaged message is then transmitted to the desktop system 10 at step 106. As described above, the redirector program 112 executing at the desktop system then strips the outer envelope and routes the reply message to the appropriate destination address using the address of the desktop system as the "from" field, so that to the recipient of the redirected message, it appears as though it originated from the users desktop system rather than the mobile device.

If, at step 102, the mobile determines that the message is not a reply message, but an original message, then control passes to step 104, where the mobile determines if the user is using the redirector software 12 at the desktop system 10, by checking the mobile unit's configuration. If the user is not using the redirector software 12, then the message is simply transmitted to the destination address at step 106. If, however, the mobile determines that the user is using the redirector software 12 at the desktop system 10, then control passes to step 110, where the outer envelope is added to the message. The repackaged original message is then transmitted to the desktop system 10 at step 106, which, as described previously, strips the outer envelope and routes the message to the correct destination. Following transmission of the message at step 106, control of the mobile returns to step 82 and waits for additional messages or signals.

Referring now to FIGS. 6 and 7, one embodiment of a mobile device 24*a* is shown in FIG. 6, and another embodiment of a mobile device 24*b* is shown in FIG. 7. It will be appreciated that the numeral "24" will hereinafter refer to any mobile device 24, including the embodiments 24*a* and 24*b*. It will also be appreciated that a similar numbering convention may be used for other general features common between FIGS. 6 and 7 such as a display 120, a positioning device 122, and a cancel or escape button 124.

The mobile device 24*a* shown in FIG. 6 comprises a display 120*a* and the cursor or view positioning device 122 shown in this embodiment is a positioning wheel 122*a*. Positioning device 122 may serve as another input member and is both rotatable to provide selection inputs to the processor 238 (see FIG. 8) and can also be pressed in a direction generally toward housing to provide another selection input to the processor 238. The display 120 may include a selection cursor 150 that depicts Generally where the next input or selection will be received. The mobile device 24*a* in FIG. 6 also comprises an escape or cancel button 124*a* and a keyboard 128. In this example, the keyboard 128 is disposed on the front face of the mobile device housing and positioning device 122 and cancel button 124*a* are disposed at the side of the housing to enable a user to maneuver the scroll wheel 122*a* while holding the mobile device 24 in one hand. The keyboard 128 is in this embodiment a standard QWERTY keyboard.

The mobile device 24*b* shown in FIG. 7 comprises a display 120*b* and the positioning device 122 in this embodiment is a trackball 122*b*. Trackball 122*b* permits multi-directional positioning of the selection cursor 150 such that the selection cursor 150 can be moved in an upward direction, in a downward direction and, if desired and/or permitted, in any diagonal direction. The trackball 122*b* is preferably situated on the front face of a housing for mobile device 24*b* as shown in FIG. 7 to enable a user to maneuver the trackball 122*b* while holding the mobile device 24*b* in one hand. The trackball 122*b* may serve as another input member (in addition to a directional or positioning member) to provide selection inputs to the processor 238 and can preferably be pressed in a direction towards the housing of the mobile device 24*b* to provide such a selection input.

The mobile device 24*b* also comprises a menu or option button 126 that loads a menu or list of options on display 120*b* when pressed, and a cancel or escape button 124*b* to exit, "go back" or otherwise escape from a feature, option, selection or display. The mobile device 24*b* as illustrated in FIG. 7, comprises a reduced QWERTY keyboard 130. In this embodiment, the keyboard 130, positioning device 122, escape button 124b and menu button 126 are disposed on a front face of a mobile device housing.

The reduced QWERTY keyboard 130 comprises a plurality of multi-functional keys and corresponding indicia including keys associated with alphabetic characters corresponding to a QWERTY array of letters A to Z and an overlaid numeric phone key arrangement. The plurality of keys that comprise alphabetic and/or numeric characters total fewer than twenty-six (26). In the embodiment shown, the number of keys that comprise alphabetic and numeric characters is fourteen (14). In this embodiment, the total number of keys, including other functional keys, is twenty (20). The plurality of keys may comprise four rows and five columns of keys, with the four rows comprising in order a first, second, third and fourth row, and the five columns comprising in order a first, second, third, fourth, and fifth column. The QWERTY array of letters is associated with three of the four rows and the numeric phone key arrangement is associated with each of the four rows.

The numeric phone key arrangement is associated with three of the five columns. Specifically, the numeric phone key arrangement may be associated with the second, third and fourth columns. The numeric phone key arrangement may alternatively be associated with keys in the first, second, third, and fourth rows, with keys in the first row including a number "1" in the second column, a number "2" in the third column, and a number "3" in the fourth column. The numeric phone keys associated with keys in the second row include a number "4" in the second column, a number "5" in the third column, and a number "6" in the fourth column. The numeric phone keys associated with keys in the third row include a number "7" in the second column, a number "8" in the third column, and a number "9" in the fourth column. The numeric phone keys associated with keys in the fourth row may include a "*" in the second column, a number "0" in the third column, and a "#" in the fourth column.

The physical keyboard may also include a function associated with at least one of the plurality of keys. The fourth row of keys may include an "alt" function in the first column, a "next" function in the second column, a "space" function in the third column, a "shift" function in the fourth column, and a "return/enter" function in the fifth column.

The first row of five keys may comprise keys corresponding in order to letters "QW", "ER", "TY", "UI", and "OP". The second row of five keys may comprise keys corresponding in order to letters "AS", "DF", "GH", "JK", and "L". The third row of five keys may comprise keys corresponding in order to letters "ZX", "CV", "BN", and "M".

It will be appreciated that for the mobile device 24, a wide range of one or more positioning or cursor/view positioning mechanisms such as a touch pad, a Joystick button, a mouse, a touchscreen, set of arrow keys, a tablet, an accelerometer (for sensing orientation and/or movements of the mobile device 24 etc.), or other whether presently known or unknown may be employed. Similarly, any variation of keyboard 128, 130 may be used. It will also be appreciated that the mobile devices 24 shown in FIGS. 6 and 7 are for illustrative purposes only and various other mobile devices 24, presently known or unknown are equally applicable to the following examples.

Figure 8:
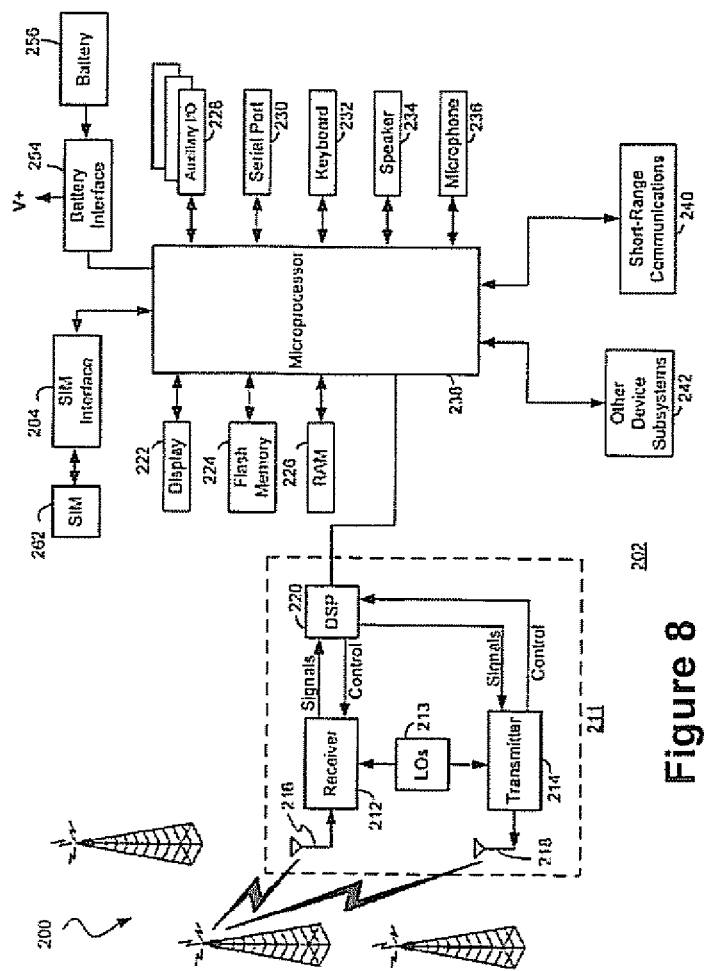
FIG. 8 is a schematic block diagram of components of the mobile device of any or both of FIGS. 1 and 2.

FIG. 8 is a detailed block diagram of a preferred mobile station 202 of the present disclosure. The term "mobile station" will herein refer to the operable components of, e.g. mobile device 24. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities) e.g. mobile device 24 shown in FIGS. 6 and 7. Mobile station 202 may communicate with any one of a plurality of fixed transceiver stations 200 within its geographic coverage area.

Mobile station 202 will normally incorporate a communication subsystem 211 which includes a receiver 212, a transmitter 214, and associated components such as one or more (preferably embedded or internal) antenna elements 216 and 218, local oscillators (LOs) 213, and a processing module such as a digital signal processor (DSP) 220. As will be apparent to those skilled in field of communications, particular design of communication subsystem 211 depends on the communication network in which mobile station 202 is intended to operate.

Mobile station 202 may send and receive communication signals over a network after required network registration or activation procedures have been completed. Signals received by antenna 216 through the network are input to receiver 212, which may perform such common receiver functions as signal amplification, frequency down conversion, filtering, channel selection, and like, and in example shown in FIG. 8, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202. In one embodiment, mobile station 202 uses a Subscriber Identity Module or "SIM" card 262 to be inserted in a SIM interface 264 in order to operate in the network. SIM 262 is one type of a conventional "smart card" used to identify an end user (or subscriber) of the mobile station 202 and to personalize the device, among other things. Without SIM 262, the mobile station terminal in such an embodiment is not fully operational for communication through a wireless network. By inserting SIM 262 into mobile station 202, an end user can have access to any and all of his/her subscribed services. SIM 262 generally includes a processor and memory for storing information. Since SIM 262 is coupled to a SIM interface 264, it is coupled to microprocessor 238 through communication lines. In order to identify the subscriber, SIM 262 contains some user parameters such as an International Mobile Subscriber Identity (IMSI). An advantage of using SIM 262 is that end users are not necessarily bound by any single physical mobile station. SIM 262 may store additional user information for the mobile station as well, including datebook (or calendar) information and recent call information. It will be appreciated that mobile station 202 may also be used with any other type of network compatible mobile device 24 such as those being code division multiple access (CDMA) enabled and should not be limited to those using and/or having a SIM card 262.

Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides a regulated voltage V to all of the circuitry.

Mobile station 202 includes a microprocessor 238 which controls overall operation of mobile station 202. Communication functions, including at least data and voice communications are performed thorough communication subsystem 211. Microprocessor 238 also interacts with additional device subsystems such as a display 222, a flash memory 224, a random access memory (RAM) 226, auxiliary input/output subsystems 228, a serial port 230, a keyboard 232, a speaker 234, a microphone 236, a short-range communications subsystem 240, and any other device subsystems generally designated at 242. Some of the subsystems shown in FIG. 3 perform communication-related functions, whereas other subsystems may provide "resident" or on-device functions. Notably, some subsystems such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, as well as the inventive functionality of the present disclosure, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In the present disclosure, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228S. Keyboard 232 is preferably a complete alphanumeric keyboard and/or telephone-type keypad (as discussed above). These composed items may be transmitted over a communication network through communication subsystem 211.

For voice communications, toe overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 8 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 8 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

An application, such as a contacts application 430 (see FIG. 9 described below), may then be initiated (opened or viewed) from display 120 by highlighting a contacts icon using the positioning device 122 and providing a suitable user input to the mobile device 24. For example, contacts application 430 may be initiated by moving the positioning device 122 such that the contacts icon is highlighted, and providing a selection input, e.g. by pressing the trackball 122b.

Movement, navigation, and/or scrolling with use of a cursor/view positioning device 122 (e.g. trackball 122b or scroll wheel 122a) is beneficial given the relatively large size of visually displayed information and the compact size of display 120, and since information and messages are typically only partially presented in the limited view of display 120 at any given moment. As previously described, positioning device 122—scroll wheel 122a and trackball 122b, are helpful cursor/view positioning mechanisms to achieve such movement. Positioning device 122, which may be referred to as a scroll wheel or scroll device 12a in one embodiment FIG. 6), specifically includes a circular disc which is rotatable about a fixed axis of housing and may be rotated by the end user's index finger or thumb.

As noted above, in another embodiment (FIG. 7) the trackball 122b comprises a multi-directional member that enables upward, downward and if desired, diagonal movements. The multi-directional movements afforded, in particular, by the trackball 122b and the presentation of a grid of icons and folders (not shown) provides the user with flexibility and familiarity of the layout of a traditional desktop computer interface. Also, the positioning device 122 enables movement and selection operations to be executed on the mobile device 24 using one hand. The trackball 122b in particular also enables both one-handed use and the ability to cause the cursor 132 to traverse the display 120 in more than one direction.

Figure 9:
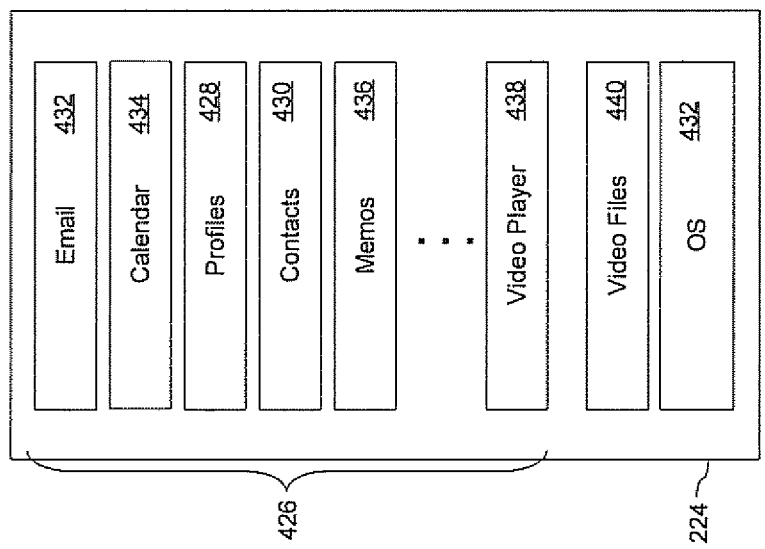
FIG. 9 is a schematic block diagram of the memory shown in FIG. 8.

As shown in FIG. 9, memory 224 includes a plurality of applications 426 associated with icons shown on display 120 for the processing of data. Applications 426 may be any variety of forms such as, without limitation, software, firmware, and the like. Applications 426 may include, for example, the contacts application 430, electronic mail (e-mail) 432, calendar program 434, memo program 436, video player 438 etc. An operating system (OS) 432 also resides in memory 224. The mobile devices 24 of the present disclosure are also configured to enable communication between different ones of the applications, e.g. between contacts application 430 and the email application 432. Also, the icons 136 for the applications on the devices 24 can be modified, named, moved, sorted and otherwise interacted with for the purposes of organizing and/or manipulating the visibility of the icons for those applications 426.

In one embodiment, one or more video files 440 are stored in memory 224, which are configured to be used with the video player 438. Video files 440 are often stored in a compressed (encoded) form that must be decompressed (decoded) by the processor 238 in order to be played on the video player 438. It will be appreciated that the video files 440 may be loaded from an external source through a web browser or downloaded from a web site accessed through the communication system 200 and need not be stored directly on the mobile device 24.

Figure 10:
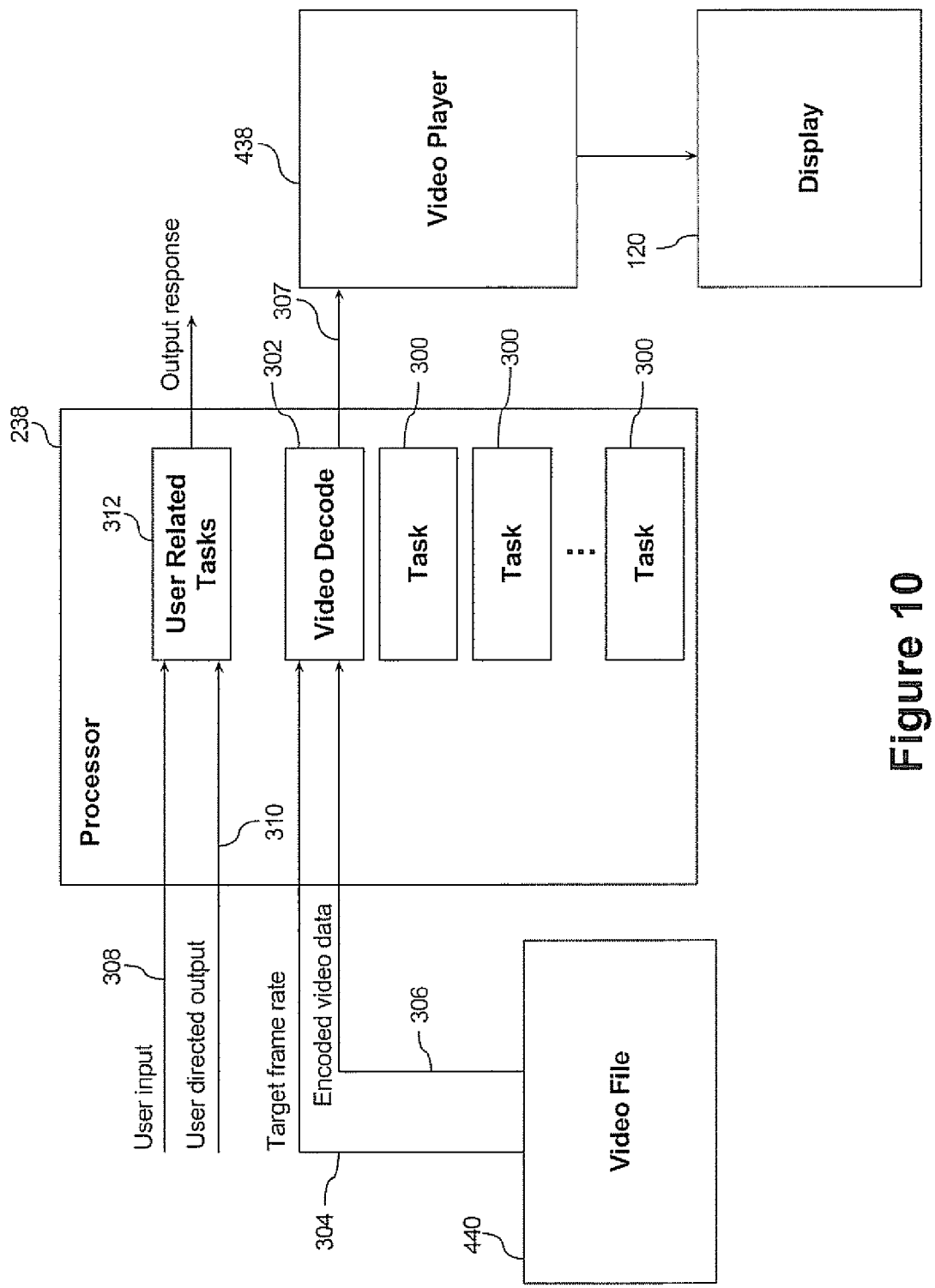
FIG. 10 is a schematic block diagram of a processor processing tasks including a task involving decoding a video file.

In one embodiment, video decoding is one of a number of tasks that the processor 238 is responsible for performing. Referring now to FIG. 10, the processor 238 is shown with a number of defined tasks 300 that execute a particular set of instructions for providing a function or service on the mobile device 24. In the example of video decoding, a video decoding task 302 obtains a target video frame rate 304 and the encoded video data 306 from the video file 440 stored in memory 224. The video decoding task 302 decodes the encoded video data 306 and provides decoded data 307 to the video player 438 at a particular frame rate that is preferably close to or exactly at the target frame rate 304. The video player 438 is responsible for playing the video on the display 120 using a suitable user interface such as a video portal, viewer etc.

As can be seen in FIG. 10, the processor 238 also processes user input 308 (e.g. keystrokes or positioning device movements) and user directed output 310 (e.g. status bar updates such as displaying an "unread mail" icon) to perform user related tasks 312.

Video decoding is a periodic process, namely it uses processor power for specific intervals of time in a repeated fashion. Although it is important that the period for performing a periodic task is as accurate as possible, it is generally desirable to ensure that the mobile device 24 respond to user related tasks in a timely manner. As discussed above, some processor tasks use up significant processor power such that interactive tasks such as cursor 150 movements are adversely affected and clearly noticeable to the user.

It has been recognized that the amount of processing being done each period in a periodic task is largely independent of the period. Therefore, by increasing the period at which the task runs, along with altering the task in some way to lessen the processor burden, e.g. frame removal in video, the average processor usage can be reduced to meet a particular target. This can be done to ensure that user input is not affected by the periodic task. In other words, a periodic task can be intelligently degraded and altered to compensate for such degradation in order to free up enough processor usage space so as to not adversely affect user input.

In order to maintain a selected amount of available processor usage, the processor 238 is configured to react to user input and user directed output (user related tasks) by determining the overall processor usage and target one or more specific periodic tasks to keep the processor usage at (or below if possible) a predetermined threshold.

Figure 11:
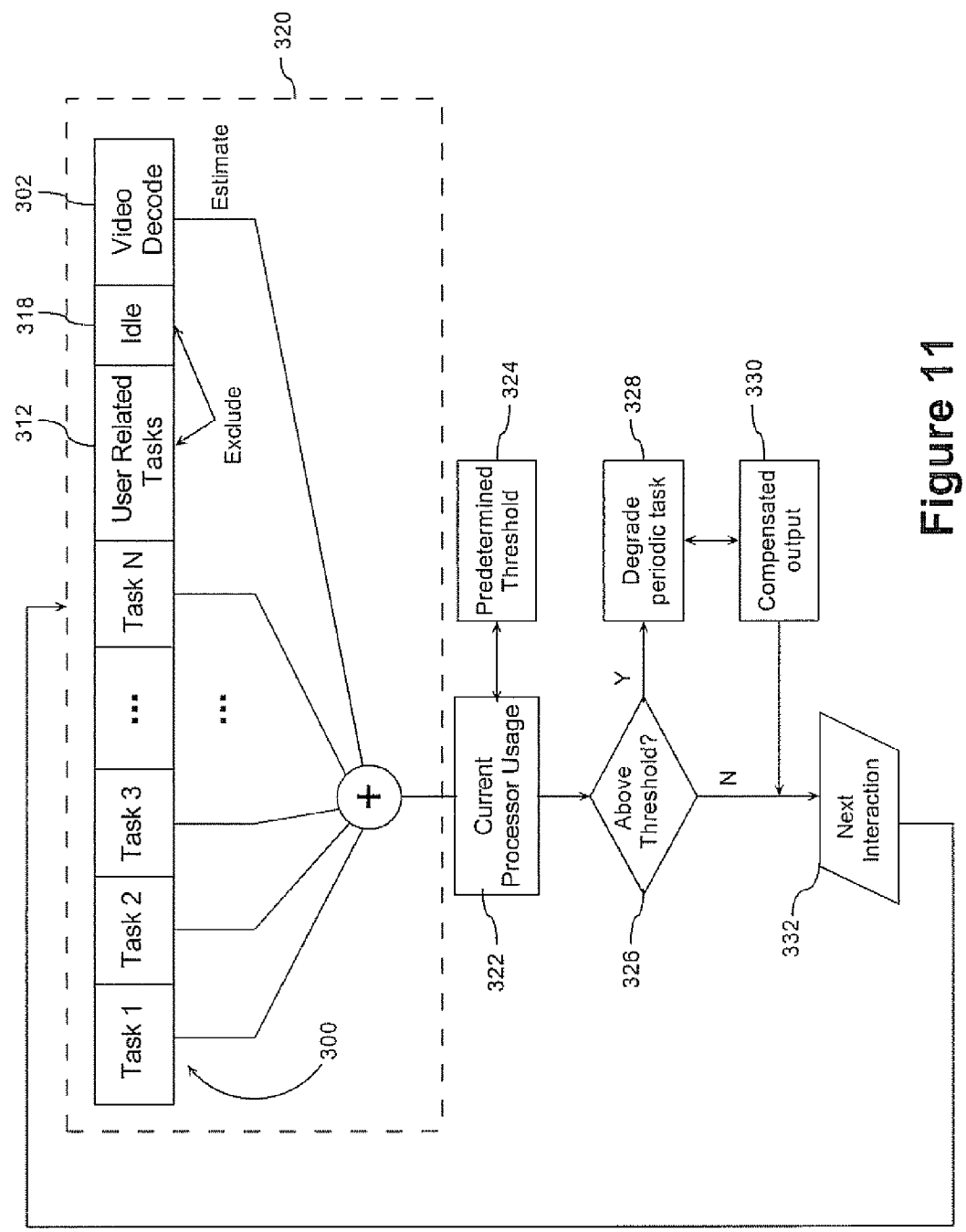
FIG. 11 is a flow diagram illustrating an intelligent degradation of a periodic task to compensate for a user related task.

Turning now to FIG. 11, a flow chart illustrating a process for controlling processor usage is provided. Preferably, the process shown in FIG. 11 is performed each time the processor senses, receives or otherwise handles a user related task in response to a user related event. For example, a status region on the mobile device 24 (e.g. along the top of the display 120) may be updated every 1 second to provide a current indication of the signal strength, battery power, time, date, active alarms, unread mail, telephone messages etc. This would then require the process shown in FIG. 11 to be executed every 1 second at a minimum. Other user related tasks such as cursor movements and keystrokes may cause the process to execute at other times. It will therefore be appreciated that the frequency of execution for the process shown in FIG. 11 is dependent on the nature of the features/services provided by the mobile device 24 as well as user input. In this way, the process should be configured such that it can run in a dynamic, "real-time" fashion. It will be appreciated that where possible, the process can also be configured to run in a scheduled or substantially scheduled (i.e. frequent) manner.

At step 320, the processor 238 determines the current processor usage based on the tasks 300 that are currently being performed. In one embodiment, the processor 238 is configured such that the tasks 300 and the periodic task 302 (generally a task 300 itself) consume a relatively fixed amount of processor power, with the remaining processor power that is left over being allocated to user related tasks 312 and idle time 318 that cannot readily be quantified as it considers the time at which the processor 238 is not performing any task. As such, the user related tasks 312, without the intelligent degradation discussed below, are prone to being adversely affected as more fixed tasks 300 (including periodic task 302) are run.

As can be seen in FIG. 11, an arbitrary N number of tasks 300 are currently being performed, as well as the user related tasks 312 discussed above. The processor 238 also considers the idle portion 318 of processor usage and a specific periodic task 302 (e.g. video decoding). In order to determine if the processor usage should be degraded to accommodate the user related tasks 312, the processor 238 first determines what if any periodic task 302 is being performed. For example, when the status bar is to be updated, the processor 238 determines that a video file 440 is scheduled to be decoded, i.e. the video decode task 302 is being performed. Since the video decode task 302 is periodic, it can be intelligently degraded to compensate for the user related task of updating the status bar if necessary.

As discussed above, the user related tasks 312 are generally accorded the remaining processor power left over from the currently performed fixed tasks. As such, in addition to the idle portion 318, the user related tasks 312 can be excluded from the computation. To compute the current processor usage, the processor 238 adds the processor power being consumed from each task 300 as well as an estimate of the processor power being used by the video decode task 302 (periodic task). The estimate can be determined based on expected performance, previous performance or even an average usage based on other predetermined data. The sum of the individual processor "usages" then constitutes the current processor usage 322, which can be compared with the predetermined threshold 324. The predetermined threshold 324 is a target value that is intended to leave enough processor power to the user related tasks 312 such that the response to these tasks is not detrimental to the usability of the mobile device 24. The threshold 324 is typically dependent on the number of user related tasks 312 and the overall processor power. As such, the predetermined threshold 324 will vary from mobile device to mobile device.

It has been found that the processor usage to decode videos up to 320×240 resolution for a mpeg4 format is typically around 30%. However, if a user attempts to play an unsupported video (i.e. being much larger than can be supported) the processor usage can be saturated at 100%. At normal operation without user related interactions (user related tasks 312), a suitable saturation point for the processor 238 has been found to be 93%. A suitable threshold 324 (i.e. processor usage when user related tasks are taken into account) is 70%. This translates to approximately 21.8 million cycles per second and 93.6 million cycles per second available for user related tasks 312 respectively.

Turning back to FIG. 11, at step 326, the processor 238 determines if the current processor usage 322 is greater than or above the threshold 324. If not, the processor 238 does not perform any degradation as the processor is not currently saturated. If the processor usage 322 is above the threshold 324, then the periodic task, e.g. the video decode task 302 identified in step 320 is intelligently degraded at step 328. This provides a compensated output 330, which amounts to the degraded version of the periodic task, e.g. decoded video data 307 which has selectively removed certain frames.

Figure 12:
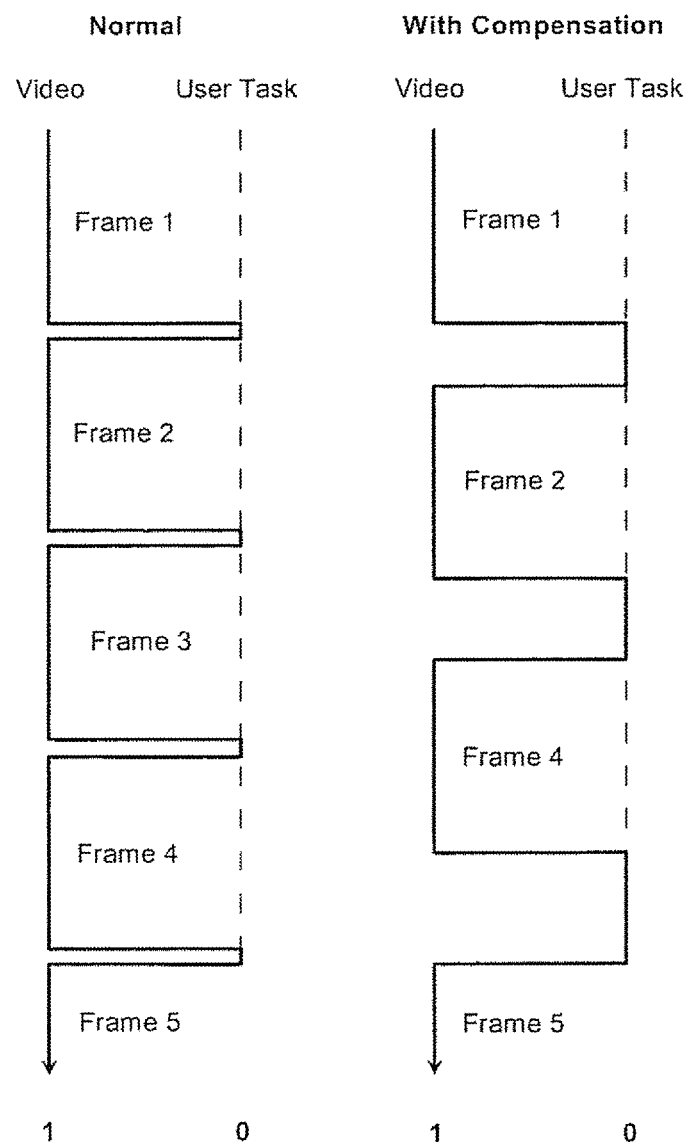
FIG. 12 is a timing diagram illustrating frames in a video decoding sequence with and without compensation.

To illustrate one example for intelligently degrading a video decode task 302 reference is now made to FIG. 12. As can be seen, the normal video decoding plot is periodic, involving a large proportion of the task saturating the processor (solid line along "video" side) and a small proportion freeing processor power for user related tasks 312. In other words, when the plot reads "1", the video decode task 302 is actively consuming the processor 238, whereas when it reads "0", the processor 238 is available for user related tasks 312.

Often, the amount of time that the video decode task 302 would enable the processor 238 to handle user related tasks is not enough to prevent the user from noticing a "sluggish" response. Many periodic tasks, such as video decoding, can be degraded to free up more time for processing user related tasks 312. For example, certain frames can be selectively removed as shown in the right-hand plot in FIG. 12. In the example shown, Frame 3 is removed and the period increased such that at a later time (i.e. Frame 5 in this example), the normal period can resume. As such, the video decode task 302 can be degraded for only the amount of time needed to compensate for the current situation.

For instance, there may be several tasks 300 being performed in addition to the video decode task 302. At the time of processing a user related input such as a cursor move, the processor 238 is saturated and the degradation shown in FIG. 12 is performed. However, by the time the next cursor move is sensed, one of the tasks 300 may be completed while the video decode task 302 is still being performed. If the task 300 that has completed drops the overall processor usage to below the threshold 324, then the video decode task 302 may no longer require degradation. In this way, the process illustrated in FIGS. 11 and 12 can be performed dynamically such that degradation only needs to occur if the processor 238 is saturated at a particular time.

In order to intelligently degrade the periodic task, e.g. the video decode task 302, the processor 238 is configured and the particular task configured such that the degradation is permissible. For example, in order to remove frames in a video file 440, certain considerations need to be made. A video frame sequence {|I P P B P P P|I P P B P P P|} may have restrictions such that only the P frames can be removed. Since P frames depend on at least one previous frame, and B frames depend on at least one frame before and one frame after, any frame selected for removal should also remove a chain of frames which depend thereon. If frame 1 (an I frame) is removed in the sequence, frame 2 (P frame) which depends on it, is also removed. Frame 3 (P frame) which depends on frame 2 is then also removed. This chain will carry forward all the way to frame 7 (I frame). However, removing frame 6 (P frame) would also be acceptable, as no frame depends thereon. Therefore, the processor 238 can only degrade the video file 440 by removing these frames as they occur. The video decode task 302 would then be programmed to distinguish these frames and accommodate a processor signal indicating that the next "P" frames should be removed and the period adjusted to smooth out the frame sequence. This provides a compromise between the user related tasks 312 and the performance of the video output.

The processor 238 and tasks 300 (including those that are periodic) are therefore programmed to intelligently make the determinations and perform the necessary compensations to degrade the selected task without significantly affecting its performance. For example, the processor 238 should not degrade the video output such that it is overly choppy. A balance in the objectives of the interactive and non-interactive tasks should be considered.

Figure 13:
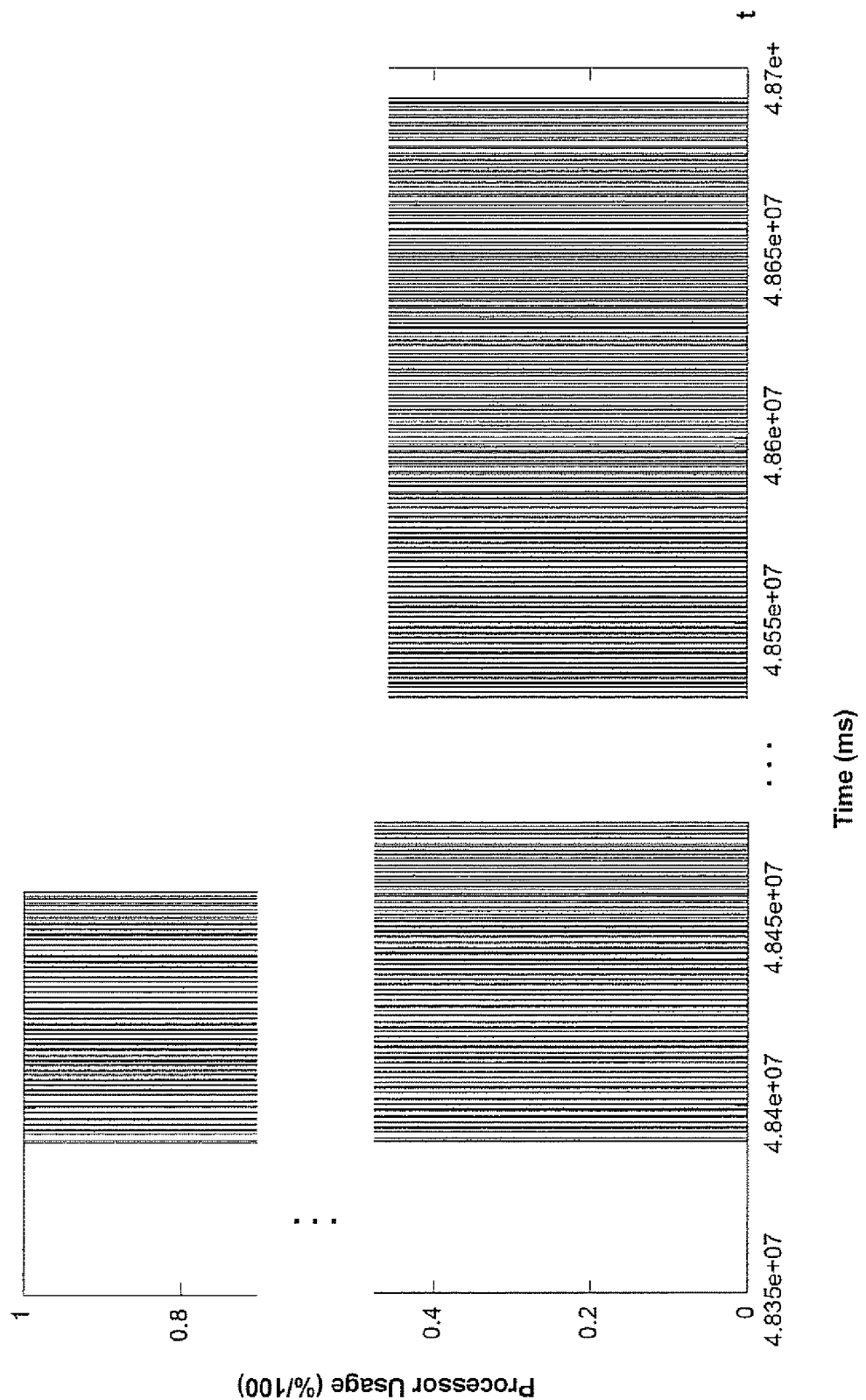
FIG. 13 is a timing diagram illustrating a video playing on the mobile device of FIG. 6 or FIG. 7.

FIG. 13 illustrates the temporal frequency of a video task 302 for playing an unsupported 480×360 video. During the video decode task 302, a keystroke is performed at time 48448621, which takes until 48479718 to process, and a cursor move then performed using the trackball 122b at time 48582828. These actions involve a scalable vector graphics (SVG) update from the display 120 which can be considerably slow and thus require processor time. As such, the processor 238 compensates by degrading the video to give a higher amount of processor time (meaning the graph is frequently at 0) for the remainder of the video.

The video file 440 in this example provides a target frame rate 304 having a period of 1093.359 of the units being used in the plot shown in FIG. 13. It can be seen that the target period is not being achieved, even at the beginning of the video and thus is compensating for other tasks. The periods [48448621, 48479718] and [4852828, 48691857] show a period that is visually greater than the other times in the graph. Since the duration of the plot at "1" does not change (this is the time taken for decoding the frame), the fact that the graph looks more sparse during these time periods illustrates that more time is being spent at "0" to reduce the saturation of the processor 238 to accommodate user related tasks 312.

The video shown in FIG. 13 desires a period of 33.37 milliseconds, however, according to the plot, this dips to as low as 124.23 milliseconds when the processor 238 is overly saturated. This reduces the processor load by a factor of 3.72. A total of 34 frames are skipped during the playback as in the timing diagram to reduce the processor load further. It can be appreciated that although 1/3.72 times the expected video rate is generally not desirable, such degradation can be done at certain times to accommodate user interactions. Specifically, if the processor usage was limited to 93%, the 21.8 million cycles per second available to the user related tasks 312 would be unacceptable, but the 93.6 million cycles per second available when limited to 70% usage is just enough and thus the threshold 324 chosen to provide a compromise. In the example shown in FIG. 13, the video would likely be sluggish (given a typical processing power), and there is only one point in this plot (immediately following the 205$^{th}$ spike in the plot) where there is an I-frame and frames can be skipped to catch up. Accordingly, such a low point or worst case degradation in the video would only be felt when there is an interaction with the user.

The processor 238 may also be configured to intelligently degrade more than one periodic task, e.g. a Bluetooth™ communication and a video decode task 302. In order to degrade these tasks enough to meet the requirements of the threshold 324, the processor 238 not only has knowledge of how each task operates, but the two tasks being degraded communicate with each other to find a compromise that is suitable at the current time. For example, an audio track for a video file 440 could be degraded at the same time as a video decode task 302. However, the audio and video tasks will need to be compensated such that they do not become out of sync. Therefore, there should be a compromise in the degradation of each task to ensure that the performance is still acceptable to a certain degree. It is therefore appreciated that the considerations for intelligently degrading tasks becomes significantly more difficult as more degradations are performed in parallel. As such, it is desirable to intelligently degrade a single task, or limit the processor usage for certain tasks to avoid the complexities in configuring the processor 238 to handle such compromises if possible. However, where the processor usage is well beyond the threshold 324, it would be more beneficial to degrade a pair of tasks to share the burden.

For example, the Bluetooth™ advanced audio distribution profile (A2DP) specification lists several audio formats that may be used over such a link. Each side of the link may support any subset of these formats. To ensure that the devices 24 can communicate, the devices 24 are required to support the smart bitrate control (SBC) format. There are several parameters to SBC that can be modified and other formats may support other parameters. Important parameters are bitrate and sample rate. The format used can affect the processor 238 on both sides, and the parameters for the format can change the bitrate and sample rate. If processor usage is to be freed when a Bluetooth™ A2DP connection is active, the A2DP connection can degrade to free up approximately 10 million cycles per second, and the video then would only need to scale back enough to free up the remainder. If A2DP is not active, then the video would likely need to compensate fully to meet the threshold 324.

It can therefore be seen that by increasing the period at which a task rums, along with altering the task in a way that selectively degrades the task (e.g. frame removal), the average processor usage can be reduced to meet a particular target which can ensure that user input is not affected by the periodic task. In other words, a periodic task can be intelligently degraded and altered to compensate for such degradation in order to free up enough processor usage space so as to not adversely affect user input.

Although the above examples are described in the context of video decoding, it will be appreciated that the principles described equally apply to other periodic tasks such as audio decoding, radio communications, Bluetooth™ communications etc.

It will also be appreciated that the principles described above may also be used to degrade non-periodic tasks which are also capable of being degraded during certain intervals to compensate for user related tasks. For example, lowering the bitrate of an A2DP connection is not related to periodic execution and can be used to reduce processor usage by a significant degree as discussed above.

Although the above has been described with reference to certain specific embodiments, various modifications thereof will be apparent to those skilled in the art as outlined in the appended claims.

The invention claimed is:

1. A method for controlling usage of a processor in a mobile device, comprising:
   during operation of the processor, determining a periodic task performed by the processor, the periodic task being degradable and comprising a plurality of frames;
   sensing a user input to a user interface of the mobile device being operated by the processor, while the processor is performing the periodic task, the user input corresponding to an interactive user related task to be performed by the processor in response to the user input; and
   in response to the sensing of the user input:
      determining a total usage of the processor including a value indicative of usage for performing the periodic task;
      comparing the total usage to a predetermined threshold indicative of a maximum usage for the processor; and
      if the total usage does not meet the threshold, degrading the periodic task by removing one or more of the plurality of frames and increasing a period of the periodic task, thereby reducing the total usage such that the threshold is met for an amount of time necessary to compensate for the interactive user related task, and restoring normal operation of the periodic task thereafter.

2. A mobile device comprising a non-transitory memory for storing computer executable instructions, at least one input mechanism, and a processor for executing the instructions,
   the instructions for:
      during operation of the processor, determining a periodic task performed by the processor, the periodic task being degradable and comprising a plurality of frames;
      sensing a user input to a user interface of the mobile device being operated by the processor, while the processor is performing the periodic task, the user input corresponding to an interactive user related task to be performed by the processor in response to the user input; and
      in response to the sensing of the user input:
         determining a total usage of the processor including a value indicative of usage for performing the periodic task;
         comparing the total usage to a predetermined threshold indicative of a maximum usage for the processor; and
         if the total usage does not meet the threshold, degrading the periodic task by removing one or more of the plurality of frames and increasing a period of the periodic task, thereby reducing the total usage such that the threshold is met for an amount of time necessary to compensate for the interactive user related task, and restoring normal operation of the periodic task thereafter.

3. The method according to claim 1 wherein removing the one or more of said plurality of frames comprises removing content from the periodic task.

4. The method according to claim 3 wherein the periodic task comprises video decoding, and the removing content comprises removing one or more frames from a video.

5. The method according to claim 1, further comprising repeating the method for at least one additional user input handled by the processor.

6. The mobile device according to claim 2 wherein meeting the threshold comprises controlling usage of the processor to be at or below the threshold.

7. The method according to claim 1 wherein determining the total usage comprises adding the sum of individual processor usages for one or more fixed tasks to an estimate for the value based on predetermined information pertaining to the selected task.

8. The method according to claim 7 wherein determining the total usage excludes processor usage for performing the interactive user related task.

9. The method according to claim 1 comprising determining another periodic task and the degrading comprises performing a first degradation of the periodic task and a second degradation of the other periodic task, wherein the first and second degradations together reduce the total usage such that the threshold is met.

10. The method according to claim 1 wherein meeting the threshold comprises controlling usage of the processor to be at or below the threshold.

11. A non-transitory computer readable storage medium storing computer executable instructions, that when executed by a mobile device, cause the mobile device to perform operations comprising:
during operation of a processor of the mobile device, determining a periodic task performed by the processor, the periodic task being degradable and comprising a plurality of frames;
sensing a user input to a user interface of the mobile device being operated by the processor, while the processor is performing the periodic task, the user input corresponding to an interactive user related task to be performed by the processor in response to the user input; and
in response to the sensing of the user input:
determining a total usage of the processor including a value indicative of usage for performing the periodic task;
comparing the total usage to a predetermined threshold indicative of a maximum usage for the processor; and
if the total usage does not meet the threshold, degrading the periodic task by removing one or more of the plurality of frames and increasing a period of the periodic task, thereby reducing the total usage such that the threshold is met for an amount of time necessary to compensate for the interactive user related task, and restoring normal operation of the periodic task thereafter.

12. The mobile device according to claim 2 wherein determining the total usage comprises adding the sum of individual processor usages for one or more fixed tasks to an estimate for the value based on predetermined information pertaining to the selected task.

13. The mobile device according to claim 12 wherein determining the total usage excludes processor usage for performing the interactive user related task.

14. The mobile device according to claim 2 wherein removing the one or more of said plurality of frames comprises removing content from the periodic task.

15. The mobile device according to claim 14 wherein the periodic task comprises video decoding, and the removing content comprises removing one or more frames from a video.

16. The mobile device according to claim 2 comprising determining another periodic task and the degrading comprises performing a first degradation of the periodic task and a second degradation of the other periodic task, wherein the first and second degradations together reduce the total usage such that the threshold is met.

* * * * *